Sept. 26, 1944.   J. D. MacKAY   2,358,987
PROPELLER BLADE MEASURING APPARATUS
Filed Feb. 10, 1943   3 Sheets-Sheet 1
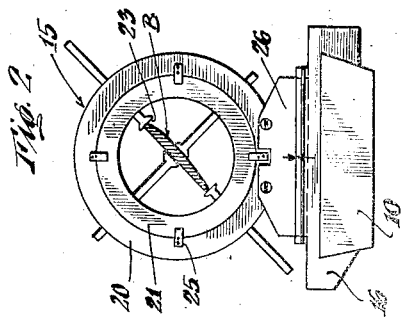
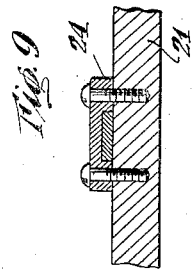
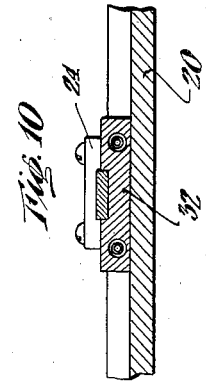
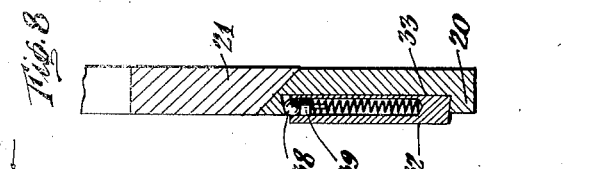
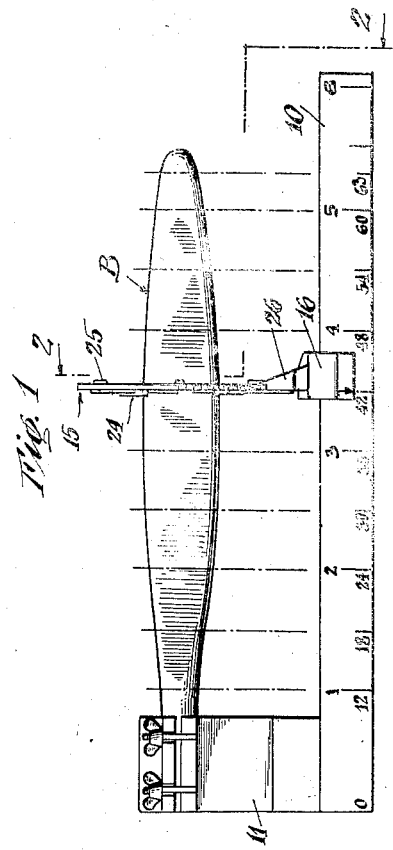
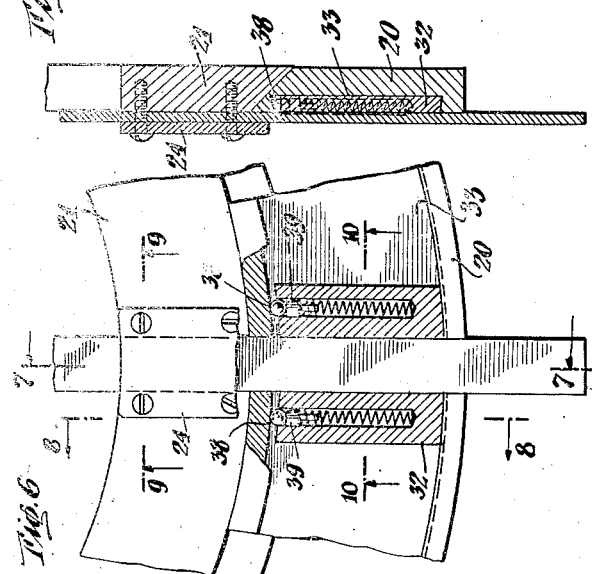
INVENTOR.
John D. MacKay
BY
his ATTORNEY

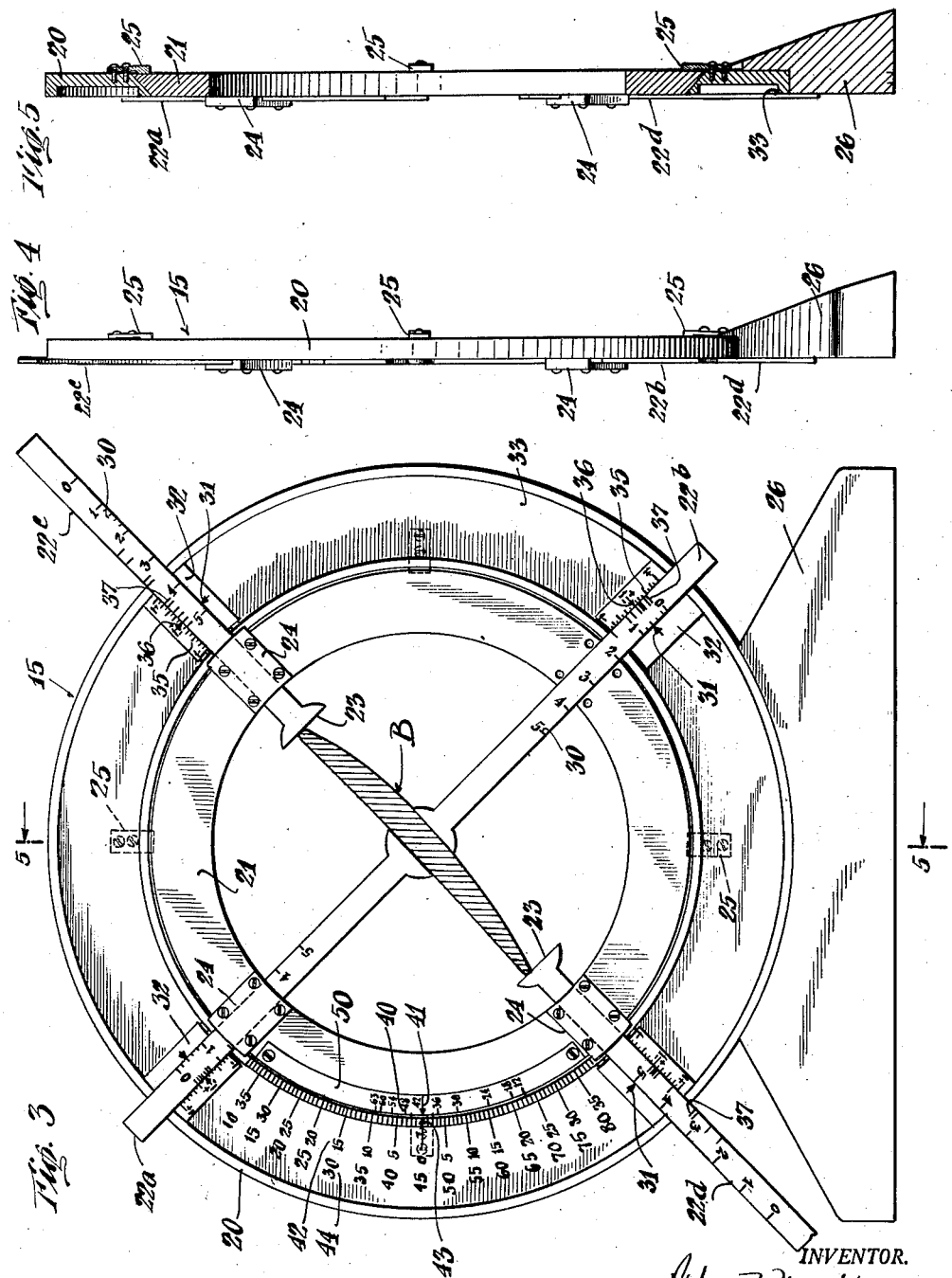

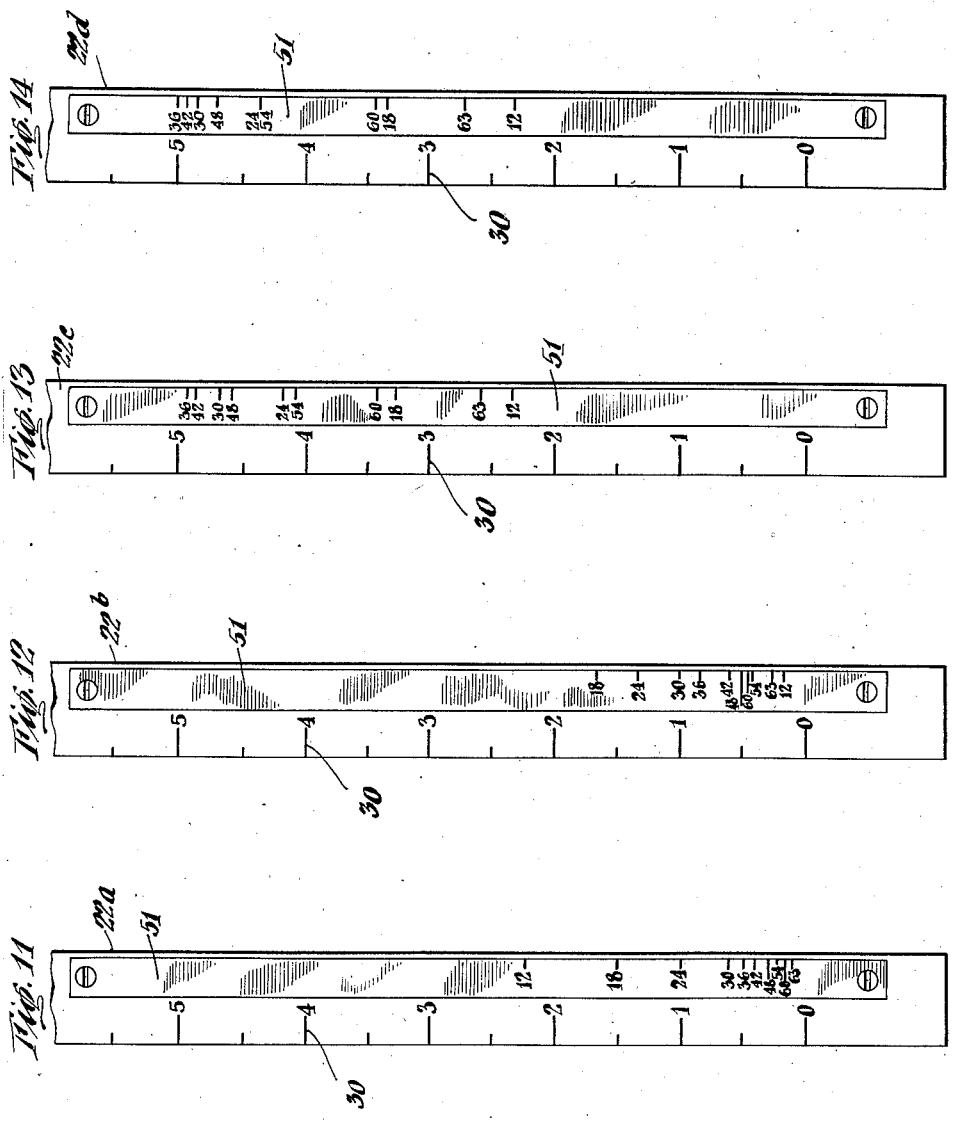

Patented Sept. 26, 1944

2,358,987

UNITED STATES PATENT OFFICE 2,358,987

PROPELLER BLADE MEASURING APPARATUS

John D. MacKay, Morristown, N. J.

Application February 10, 1943, Serial No. 475,335

16 Claims. (Cl. 33—174)

This invention relates to propeller blade measuring apparatus by which the cross-sectional dimensions and the pitch angles of propeller blades may be measured at designated measurement stations at predetermined points along the blade. More particularly, the invention relates to an improved measuring device for apparatus of this kind which has means for positioning the blade to be measured so that it extends over a base and a measuring device mounted to be slidable on the base for taking measurements at a number of stations along the length of the blade. In the use of measuring apparatus of this kind with measuring devices of the kind heretofore known, it is necessary both to position the measuring device and to set the propeller blade for making thickness measurements at each of the several measuring stations, and to position the measuring device, and to set the blade for making width measurements at each of the measuring stations, and to set the blade once for the pitch angle measurements and then again to position the measuring device at each station for making the angle measurements.

The object of the present invention is to avoid the repeated resetting of the propeller blade and to reduce the required movements of the measuring device, and otherwise to facilitate the taking of the necessary measurements. It is customary in measuring propeller blades to measure the blade at from nine to twelve stations and to make at each measuring station four dimension measurements from the axis of the blade, that is, to measure the distances from the axis of the blade to the face of the blade and to the back of the blade, the sum of these two distances being the thickness of the blade, and to measure the distances from the axis to the front, or leading, edge of the blade and to the rear, or trailing, edge of the blade, the sum of these two distances being the width of the blade at the point measured. With the measuring device of the present invention, a single setting of the blade does for all the measurements, and all four dimension measurements and the pitch angle measurement for each station are made with one positioning of the measuring device.

A full understanding of the invention can best be given by a detailed description in connection with drawings illustrating a complete measuring apparatus embodying all the features of the invention in the form now considered best, and such a description will now be given in connection with the accompanying drawings, in which:

Fig. 1 is a side view of the apparatus with a propeller blade in position for measurement;

Fig. 2 is a sectional view taken on line 2—2 of Fig. 1;

Fig. 3 is an enlarged view of the face, or reading side, of the measuring device, the movable parts of the device being in measurement positions with the device at an intermediate measuring station as in Fig. 1;

Fig. 4 is an edge view of the device as viewed from the right of Fig. 3;

Fig. 5 is a sectional view taken on line 5—5 of Fig. 3;

Fig. 6 is a further enlarged view partly in section of a portion of the reading side of the measuring device adjacent to one of the measuring rods;

Figs. 7, 8, 9 and 10 are detail sectional views taken on lines 7—7, 8—8, 9—9 and 10—10, respectively, of Fig. 6; and Figs. 11, 12, 13 and 14 are further enlarged face views of the outer end portions of the four measuring rods.

Referring to the drawings, the complete apparatus as shown by Figs. 1 and 2 comprises an elongated bed plate, or base, 10 having a standard 11 at one end provided with means for receiving and rigidly clamping the neck of a propeller blade, such as the blade B shown in Figs. 1 and 2, with the blade positioned to extend over the base 10 with its axis parallel thereto. The measuring device 15 is mounted on a carriage 16 which is slidably mounted on the base 10. The base is shaped in cross-section to serve as a slideway for the carriage so that the measuring device may be moved along the base parallel with the axis of the positioned blade for measuring the blade at designated points along its length. The carriage 16 and the slideway are such that the carriage and the measuring device are held rigidly against all lateral and vertical movement.

As stated, it is customary, in measuring propeller blades, to take measurements at specified stations along the blade. The spacing of these measurement points or stations may, of course, vary and the number of stations will usually vary according to the length of the propeller blade to be measured. For illustrative purposes, the base 10 in Fig. 1 is marked for measurements to be taken with the measuring device positioned 12, 18, 24, 30, 36, 42, 48, 54, 60 and 63 inches from the neck end of the blade.

The measuring device comprises a supporting member in the form of a frame 20 which has a circular window therein, and an annular carrier 21 rotatably mounted in the frame 20, and four radially extending measuring rods 22a, 22b, 22c and 22d slidably mounted on the carrier and spaced 90° apart. Each of the measuring rods has at its inner end an edge 23 for making contact with the propeller blade being measured, such contact edge extending at right angles to the radial line of the rod, and the rod, most desirably, and as shown, being widened at its inner end so as to provide a contact edge somewhat longer than the width of the rod. The measuring rods extend through guideways on the carrier formed as shown by channelled plates 24 secured to the face of the carrier, and the rods extend from the carrier over the face of the frame. The carrier is held in the frame, on one side by the plates 24 which extend from the carrier over the edge of the frame, and on the other side by a plurality of detachable clips 25 fastened by screws to the frame and extending over the margin of the carrier. The inner edge of the frame and the outer edge of the carrier are most desirably correspondingly bevelled as shown, and the clips 25 are shaped so that by taking up on their screws the carrier may be tightened against the bevelled edge of the frame. The adjustment should be such that the carrier may be readily turned within the frame but will tend to remain in any position to which it has been moved.

The frame has a foot piece 26 which is rigidly mounted on the carriage 16 with the face of the measuring device in a vertical plane at right angles to the direction of movement of the carriage on the base 10, and therefore at right angles to the axis of the propeller blade to be measured and in position vertically and horizontally so that the line of the axis of the positioned blade will extend through the center of the carrier 21.

Each rod has marked on its face a linear scale 30, in inches or other units of length, which as the rod is moved moves past a pointer 31, the scale extending from its zero mark inward toward the inner end of the rod, and the zero mark registering with the pointer when the rod has been moved inward to bring its contact edge to the center of the carrier.

Each measuring rod extends through a channel in the face of a flat block 32 which is movable in an annular channel 33 in the face of the frame 20 and which moves with the measuring rod whenever the carrier is given a turning movement. Each of these blocks 32 has marked on its face on one side of the rod a plus and minus linear scale 35 extending in both directions from a middle zero point marked with a pointer 36, and each rod has along its edge which is toward the plus and minus scale a number of station measuring markings 37, there being one such mark 37 for each measuring station.

It is desirable that the blocks, or scale pieces, 32 as they move with the measuring rods when the carrier is turned shall at all times maintain very closely their position against an accurately formed edge of the frame channel 33, and for this purpose the scale pieces are most desirably formed with one edge shaped to conform to the edge of the frame channel and have at the other edge at each side of the measuring rod a bearing ball 38 seated in the end of a bore in the scale piece against a spring-pressed seat 39. The sides of the frame channel are slightly undercut as shown in Figs. 7 and 8 to avoid tendency of the scale pieces to rise out of the channel.

The carrier has marked adjacent its outer edge between two of the measuring rods a series of station measuring markings 40 and has a pointer 41 at one of the station markings, and the adjacent inner edge of the frame has thereon a dual purpose angle scale of which the scale divisions are numbered to show plus and minus angles from a zero point and are also numbered in a continuous series, the dual scale thus serving as a plus and minus angle scale 42 extending in two directions from a zero point which is marked with a pointer 43, and also as a continuous angle scale 44 which has its 45° numeral at the zero point of the plus and minus scale.

A blade to be measured having been secured in the standard 11, measurements are taken with the measuring device positioned at each of the several measuring stations successively. At each station the carrier is turned and the measuring rod 22a is moved in until its contact edge 23 is flat against the face of the blade. The pitch angle may then be read on the scale 44 and the distance of the face of the blade from the blade axis may be read on the linear scale 30 of rod 22a. The other dimensions may then be read on the scales 30 of rods 22b, 22c and 22d, the rods having been moved in to bring their contact edges into engagement with the blade. The dimension measurements and pitch angle measurements may thus all be made with a single setting of the blade and with a single positioning of the measuring device at each measuring station.

Usually the measurements must, at the time or later, be compared with a chart showing the desired measurements, and the difference between each actual measurement and the chart figure recorded. This takes time. I therefore provide, in addition to, or, as it may be, in place of, the scales 30 and 44, the station measuring markings 40 and the plus and minus angle scale 42, one on the carrier and the other on the frame, and the station measuring markings 37 on the measuring rods and the plus and minus linear scales 35 on the scale pieces 32. The plus and minus scales 35 might, obviously, be on the measuring rods and the station markings 37 on the scale pieces, or other surface moving with the rods as the carrier is turned, if the radial dimension of the scale pieces or such other surface were great enough to receive the station markings. By means of these station markings and the cooperating plus and minus scales, the pitch angles and the dimensions of the blade at the several measuring stations are readily and quickly checked without reference to the measurements chart; and all differences, plus or minus, between the pitch angles and dimensions of the blade being measured and the pitch angles and dimensions as they should be, that is, as they appear on the chart, are read directly from the measuring device without the operator having to refer to the measurements chart.

The station markings 40 for the pitch angle measurements are so placed that when the measuring device is at any one of the stations and the carrier 21 has been turned to bring the contact edge 23 of rod 22a parallel with the face of the blade, the mark 40 for that station will register with pointer 43 at the zero point of plus and minus scale 42 if the pitch angle of the blade at that station is right; but if the pitch angle of the blade at that station is not right, then the mark 40 for that station will not be in register with the pointer 43 and the difference, plus or minus, between the angle of the blade and what it should be will be shown by the position of the mark with relation to the scale 42.

Similarly, the station markings 37 on the measuring rods are so positioned that when any one of the rods has been moved in to bring its contact edge 23 into engagement with the blade, the mark 37 on that rod for the station at which the carrier is positioned will register with pointer 36 at the zero point of the adjacent plus and minus scale 35 if the dimension being measured is right, but if that dimension is not right, then the mark 37 will not be opposite the pointer 36 but will indicate on the scale whether the dimension is greater or less than it should be and the extent to which it is wrong.

The station marks 40 are so positioned that when the measuring device is positioned at any one of the measuring stations and the carrier 21 has been turned to bring the contact edge 23 of rod 22a parallel with the face of a blade of the right pitch angle, the mark 40 for that station will be exactly opposite pointer 43; and the station marks 37 of each measuring rod are so positioned that with the measuring device positioned at any one of the measuring stations when the rod is moved in to bring its contact edge 23 into engagement with the side or edge of the positioned blade, the mark 37 for that station will be exactly opposite the pointer 36 of the cooperating plus and minus scale 35 if the blade is of the right dimensions.

For making the pitch angle measurements as last described, the blade is, most desirably, set by positioning the measuring device at one of the intermediate measuring stations and turning the carrier 21 to bring the mark 40 for the selected station opposite the pointer 43 and then setting the blade with its face parallel with the contact edge of the blade 22a. The single measurement (0°) for the selected station will then be the base from which the pitch angles of the blade at the other stations are reckoned.

Suppose, for example, that measurements are to be taken at ten stations as marked on the base 10 in Fig. 1, and that the blade to be measured should have the following pitch angles at the several station points:

Station__ 12″ 18″ 24″ 30″ 36″ 42″ 48″ 54″ 60″ 63″
Angle___ 57.4° 54.5° 49.5° 42.3° 37.5° 34.° 30.5° 27.7° 25.3° 24.3°

And suppose that the blade should have the following dimensions at the several measuring stations:

| Station | Face to blade axis | Back to blade axis | Leading edge to blade axis | Trailing edge to blade axis |
|---|---|---|---|---|
| 12″ | 2.2″ | .2″ | 2.3″ | 2.3″ |
| 18 | 1.5 | 1.7 | 3.3 | 3.3 |
| 24 | 1 | 1.3 | 4.2 | 4.3 |
| 30 | .6½ | 1 | 4.7 | 4.8 |
| 36 | .5 | .8 | 4.9 | 5 |
| 42 | .4 | .6 | 4.8 | 4.9 |
| 48 | .2 | .5 | 4.6 | 4.7 |
| 54 | .2½ | .4½ | 4.1 | 4.3 |
| 60 | .2 | .4 | 3.4 | 3.4 |
| 63 | .1½ | .2½ | 2.6 | 2.7 |

The station measuring marks 37 on each of the measuring rods will then be positioned with relation to the pointers 36 in agreement with these figures so that when the mark for any one of the stations on any one of the rods is opposite pointer 36, the contact edge of that rod will be at a distance from the center of carrier 21 equal to the distance shown above for that particular station and rod; it being understood that rod 22a will, as shown by Fig. 11, have its marks 37 positioned according to the correct distances from the face of the axis of the blade, rod 22c will, as shown by Fig. 12, have its marks positioned according to the back-to-axis distances; rod 22b, as shown in Fig. 13, will have its marks according to the leading edge dimensions; and rod 22c, as shown in Fig. 14, will have its marks according to the trailing edge dimensions.

If the measuring device is to be used for measuring different blades, that is, blades differing in their pitch angles or cross-sectional dimensions or length, the measuring device must obviously be provided with the proper station markings on removable parts, a set of such parts being provided for each kind of blade which is to be measured. The measuring device illustrated has a curved strip 50 marked with the station markings 40 detachably secured adjacent to the edge of carrier 21, and the station marks 37 of each of the measuring rods are on strips 51 detachably secured to the rods adjacent one edge thereof.

What is claimed is:

1. A propeller blade measuring device, comprising a frame having a window therein, an annular carrier rotatably mounted on said frame, and four radially extending measuring rods slidably mounted on said carrier at points 90° apart, each rod having a contact edge at its inner end extending at right angles to the radial line of the rod, and the carrier at one edge between two of the measuring rods having thereon, and an adjacent portion of the frame having thereon, one, an angle scale, and the other, a pointer.

2. A propeller blade measuring device, comprising a frame having a window therein, an annular carrier rotatably mounted on said frame, and four radially extending measuring rods slidably mounted on said carrier at points 90° apart, each rod having a contact edge at its inner end extending at right angles to the radial line of the rod, and the carrier at one edge between two of the measuring rods having thereon, and an adjacent portion of the frame having thereon, one, a plus and minus angle scale, and the other, station measuring markings.

3. A propeller blade measuring device, comprising a frame having a window therein, an annular carrier rotatably mounted on said frame, and four radially extending measuring rods slidably mounted on said carrier at points 90° apart, each rod having a contact edge at its inner end extending at right angles to the radial line of the rod, and the carrier at one edge between two of the measuring rods having thereon, and an adjacent portion of the frame having thereon, one, a plus and minus angle scale, and the other, station measuring markings, the station measuring markings being on a detachable strip.

4. A propeller blade measuring device, comprising a frame having a window therein, an annular carrier rotatably mounted on said frame, and four radially extending measuring rods slidably mounted on said carrier at points 90° apart, each rod having a contact edge at its inner end extending at right angles to the radial line of the rod, a surface adjacent to each rod and which moves with the carrier having, and each rod having adjacent to such surface, one, a plus and minus linear scale, and the other, station measuring markings for cooperating with the plus and minus scale.

5. A propeller blade measuring device, comprising a frame having a window therein, an annular carrier rotatably mounted on said frame, and four radially extending measuring rods slidably mounted on said carrier at points 90° apart, each rod having a contact edge at its inner end extending at right angles to the radial line of the rod, a surface adjacent to each rod and which moves with the carrier having, and each rod having adjacent to such surface, one, a plus and minus linear scale, and the other, station measuring markings for cooperating with the plus and minus scale, the station measuring makings being on detachable strips.

6. A propeller blade measuring device, comprising a frame having a window therein, an annular carrier rotatably mounted on said frame, and four radially extending measuring rods slidably mounted on said carrier at points 90° apart, each rod having a contact edge at its inner end extending at right angles to the radial line of the rod, a surface adjacent to each rod and which moves with the carrier having a plus and minus linear scale thereon, and each rod having adjacent to said surface station measuring markings thereon for cooperating with the plus and minus scale.

7. A propeller blade measuring device, comprising a frame having a circular window therein, an annular carrier rotatably mounted in the window of said frame, four radially extending measuring rods slidably mounted on said carrier at points 90° apart, each rod having a contact edge at its inner end extending at right angles to the radial line of the rod, a scale piece for each rod movable by its rod in an annular channel in the face of said frame, each scale piece having a plus and minus linear scale thereon, and each rod having a linear scale thereon and having station measuring markings thereon for cooperating with the plus and minus scale of its scale piece.

8. A propeller blade measuring device, comprising a frame having a circular window therein, an annular carrier rotatably mounted in the window of said frame, four radially extending measuring rods slidably mounted on said carrier at points 90° apart, each rod having a contact edge at its inner end extending at right angles to the radial line of the rod, a scale piece for each rod movable by its rod in an annular channel in the face of said frame, each scale piece having a plus and minus linear scale thereon, each rod having a linear scale thereon and having station measuring markings thereon for cooperating with the plus and minus scale of its scale piece, and the carrier having at its outer edge between two of the measuring rods and the frame having adjacent the outer edge of the carrier an angle scale on one and station measuring markings on the other.

9. A device for measuring the pitch angles of propeller blades, comprising a supporting member, a movable member mounted on said supporting member to turn about a center, and a radially extending rod slidably mounted on said movable member, said rod having a contact edge at its inner end extending at right angles to the line of its radial movement and in a plane parallel to the plane of turning movement of the movable member, one of said members having an angle scale thereon.

10. A device for measuring the pitch angles of propeller blades at predetermined stations along the length thereof, comprising a supporting member, a movable member mounted on said supporting member to turn about a center, a contact piece mounted on said movable member movable radially of said center and extending at right angles to the line of its radial movement and in a plane parallel to the plane of turning movement of the movable member, one of said members having a plus and minus angle scale thereon and the other having station measuring markings thereon for cooperating with said plus and minus angle scale.

11. A device for measuring propeller blades, comprising a supporting member, a carrier having a window therein mounted on said supporting member to turn about a center within its window, four radially slidable measuring rods mounted on said carrier at point 90° apart, each rod having a contact edge at its inner end extending at right angles to the radial line of the rod, an angle scale for the carrier, and a linear scale for each measuring rod.

12. A device for measuring propeller blades, comprising a supporting member, a carrier having a window therein mounted on said supporting member to turn about a center within its window, and four radially slidable measuring rods mounted on said carrier at points 90° apart, each rod having a contact edge at its inner end extending at right angles to the radial line of the rod, a surface adjacent to each rod and which moves with the carrier having a plus and minus linear scale thereon, and each rod having adjacent to such surface station measuring markings thereon for cooperating with the plus and minus scale.

13. A device for measuring propeller blades, comprising a supporting member, an annular carrier mounted on said supporting member to turn about its center, and four radially slidable measuring rods mounted on said carrier at points 90° apart, each rod having a contact edge at its inner end extending at right angles to the radial line of the rod, said supporting member having a plus and minus angle scale thereon, the carrier having station measuring markings thereon for cooperating with said plus and minus scale, a surface adjacent to each rod and which moves with the carrier having a plus and minus linear scale thereon, and each rod having adjacent to said surface station measuring markings thereon for cooperating with the plus and minus scale adjacent thereto.

14. Propeller blade measuring apparatus, comprising an elongated base, a measuring device slidable on said base, and a standard at one end of the base having clamping means for clamping the neck of a propeller blade with the blade positioned to extend over the base with its axis parallel to the direction of movement of the measuring device; in which the measuring device comprises a part mounted to slide on the base, a member extending upwardly from and rigid with said part, a member movable relatively to said upwardly extending member about the axis of the positioned blade and having a radially movable transversely extending contact piece for engaging the face of the positioned blade, one of said members having an angle scale thereon.

15. Propeller blade measuring apparatus for measuring the pitch angles of the blades at predetermined stations along the length thereof, comprising an elongated base, a measuring device slidable on said base, and a standard at one end of the base having clamping means for clamping the neck of a propeller blade with the blade positioned to extend over the base with its axis parallel to the direction of movement of the measuring device; in which the measuring device comprises a part mounted to slide on the base, a member extending upwardly from and rigid with said part, a member movable relatively to said upwardly extending member about the axis of the positioned blade and having a radially movable transversely extending contact piece for engaging the face of the positioned blade, one of said members having a plus and minus angle scale thereon and the other having station measuring markings thereon for cooperating with said plus and minus scale.

16. Propeller blade measuring apparatus for measuring the pitch angles and the dimensions of the blades at predetermined stations along the length thereof, comprising an elongated base, a measuring device slidable on said base, and a standard at one end of the base having clamping means for clamping the neck of a propeller blade with the blade positioned to extend over the base with its axis parallel to the direction of movement of the measuring device; in which the measuring device comprises a part mounted to slide on said base, a frame extending upwardly from and rigid with the part having a circular window therein, an annular carrier rotatably mounted on said frame, and four radially extending measuring rods slidably mounted on said carrier at points 90° apart, each rod having a contact edge at its inner end extending at right angles to the radial line of the rod, the carrier at one edge between two of the measuring rods and an adjacent portion of the frame having thereon one an angle scale and the other a pointer, and a surface adjacent to each rod and which moves with the carrier having, and each rod having adjacent to said surface, one a plus and minus scale and the other station measuring markings for cooperating with said plus and minus scale.

JOHN D. MacKAY.